United States Patent [19] [11] 3,745,524
Suzuki [45] July 10, 1973

[54] COMBINED DIRECTION, PARKING AND HAZARD WARNING SIGNALING APPARATUS

[75] Inventor: Masaru Suzuki, Mekikai-gun, Aichi-ken, Japan

[73] Assignee: Kabushiki-Kaisha Tokai Rika Denki Seisakusho, Aichi-ken, Japan

[22] Filed: Sept. 28, 1971

[21] Appl. No.: 184,412

[30] Foreign Application Priority Data
Oct. 6, 1970   Japan.............................. 45/99433

[52] U.S. Cl............... 340/76, 200/61.27, 340/81 F
[51] Int. Cl............................................. B60q 1/38
[58] Field of Search...................... 200/61.27, 61.3, 200/61.34, 61.35; 340/55, 67, 73, 81 R, 81 F

[56] References Cited
UNITED STATES PATENTS
1,683,496   9/1928   Stevens........................... 340/76 UX
2,010,741   7/1935   Sullender....................... 340/76 UX
2,607,840   8/1952   Hollins............................. 340/81 R
2,790,156   4/1957   Hollins................................. 340/72
3,641,493   2/1972   Suzuki et al...................... 340/81 F
2,810,899   10/1957  Foster.................................. 340/72

Primary Examiner—John W. Caldwell
Assistant Examiner—Kenneth N. Leimer
Attorney—B. Edward Shlesinger et al.

[57] ABSTRACT

A combined switching apparatus in an automotive vehicle for direction, parking and hazard warning signaling purposes, which is characterized in that when a turn signaling lamp on either side of the vehicle is actuated, the electric circuit for an indicator or parking lamp on the corresponding side is disconnected so as to make the indication of turn of the vehicle by said lamp more distinct, and further in that when the left and right turn signal lamps are simultaneously flashed for hazard warning purposes, electric circuits for energizing the parking lamps are all disconnected so as to make the simultaneous flashing of the left and right turn signaling lamps for hazard warning purposes more distinct.

5 Claims, 5 Drawing Figures

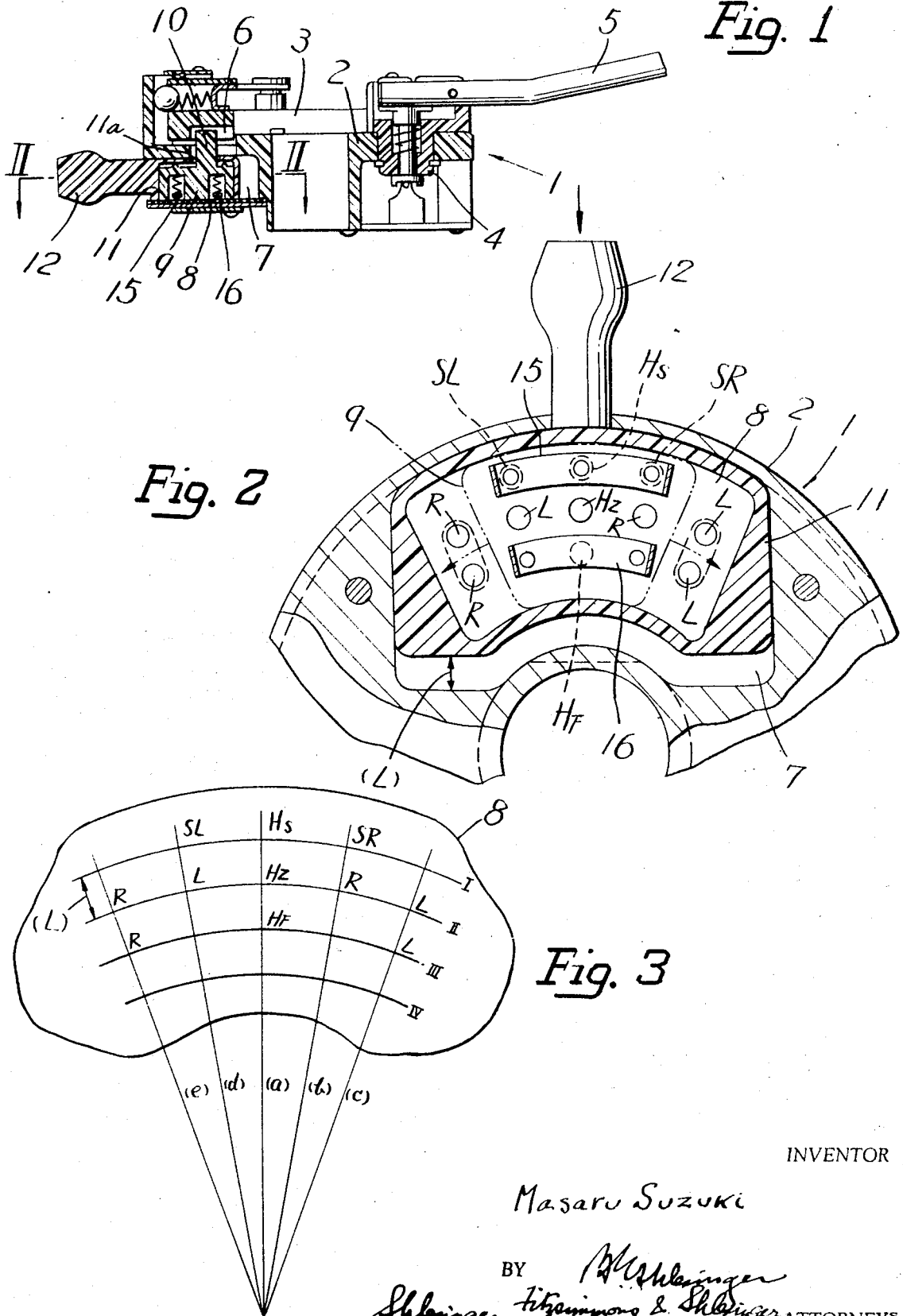

COMBINED DIRECTION, PARKING AND HAZARD WARNING SIGNALING APPARATUS

This invention relates to a combined direction and hazard warning signaling apparatus for automotive vehicles having turn signaling lamps and indicator or parking lamps, which comprises movable contact means for switch means for the turn signaling lamps operable to signal either a left or right-hand turn signaling lamp in response to the movement of an actuating member from a neutral position to operating positions on opposite sides of the neutral position by the manual operation of an operating lever connected to the actuating member, and which is characterized in that either the left or right-hand indicator or parking lamp is turned off simultaneously with the actuation of the corresponding left or right-hand turn signaling lamp so that the turning signal of the vehicle by the turn signaling lamp will be distinct, and in that, simultaneously with the acutation of the switch means for hazard warning signaling, both the left and right-hand parking lamps are turned off, and further characterized in that the movable contact means for actuating the indicator lamps are utilized also for hazard warning signaling when the hazard warning signaling switch means is actuated.

Conventional switch means for indicator lamps are mostly combined with the switch means for the turn signaling lamps. In such combined switch means for front signaling lamps and indicator lamps, for example, by the manual pulling out of its knob from a disabled postition to a first actuating position, the parking or indicator lamps are turned on, and by the successive manual pulling out of the knob from the first actuating position to a second actuating position, both the indicator lamps and front signaling lamps are turned on. There are, however, drawbacks in such combined switch means because the illumination of the indicator lamps sometimes makes the flashing of a turn signaling lamp indistinct, since a signaling lamp is usually accommodated within a single housing together with the corresponding indicator or parking lamp or very close to the latter, and also since the brightness of both lamps is nearly the same. Such indistinctness of the turning signal of a turn signaling lamp can not give an effective warning to the drivers of approaching vehicles, resulting in inviting sometimes a traffic accident.

Hence, it is an object of the present invention to provide a combined direction, parking and hazard warning signaling apparatus for automotive vehicles, by the novel structure of which the distinctness of the flashing signals developed by turn signal lamps is assured in spite of the switch means for the turn signaling lamps being combined with that for the indicator or parking lamps, use of which is made distinctive from that of the former, and in which the hazard warning actuating switch means is combined in addition, the movable contact means of which is utilized also for the for parking lamps, whereby either the parking lamps or the hazard warning signaling is selectively actuatable at a time.

In the accompanying drawings in which embodiments of the present invention are illustrated:

FIG. 1 is a vertical cross sectional view of a direction signaling apparatus provided with combined switch means made according to one embodiment of this invention;

FIG. 2 is an enlarged cross section of the apparatus, taken along the line II—II of FIG. 1;

FIG. 3 is a diagrammatic plan view of a base plate carrying stationary contacts thereon;

Figure 4:
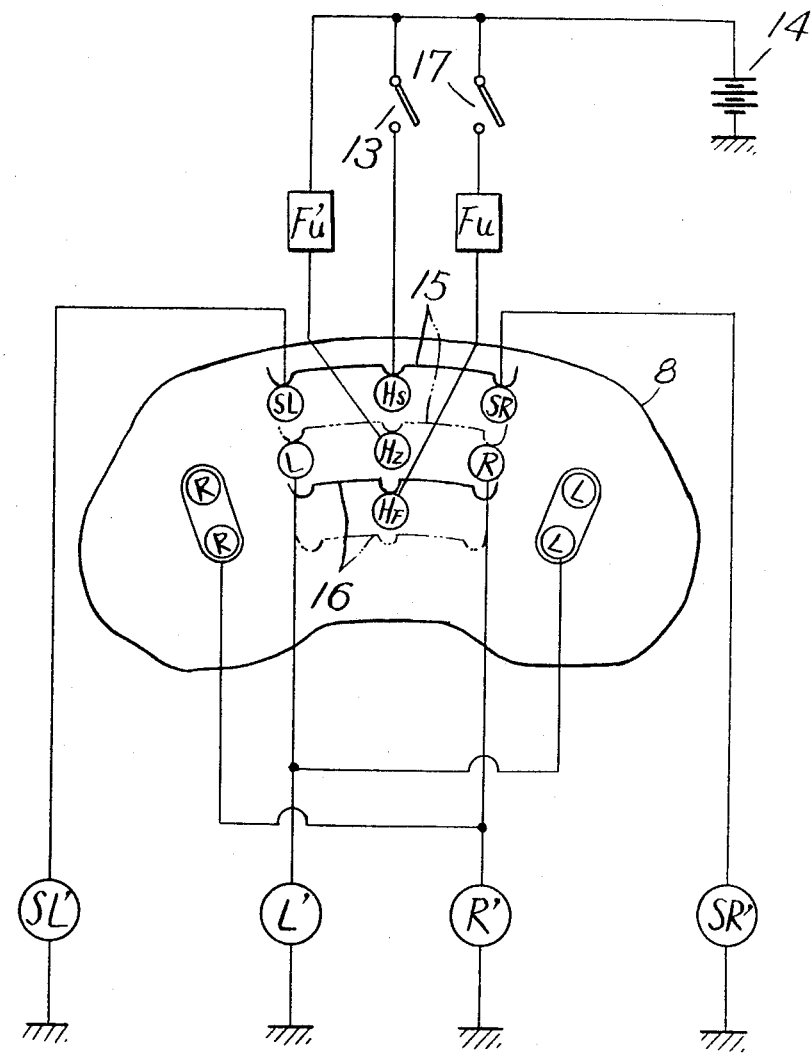
FIG. 4 is a wiring diagram of the stationary contacts illustrated in FIG. 3.

Now, referring to the drawings, a direction indicating apparatus generally indicated by numeral 1 comprises an actuating member 3, the rock shaft 4 of which is journaled for rotation in a casing body 2. Said actuating member 3 is movable from a neutral position to operating positions on opposite sides of the neutral position, by the manual operation of an operating lever 5 which is connected to the actuating member. In the undersurface of actuating member 3 adjacent to its forward end, there is provided a groove 6, and below the undersurface of casing body 2 and at a location opposite to the operating lever 5 there is provided a recess 7 for accommodating therein switch means. A plate 8 carrying stationary contacts is fitted to the bottom of the recess 7. The switch means accommodated within the recess 7 comprises a hazard warning actuating member 11 of a box-like shape having an opening at its bottom and provided with an operating knob 12 which projects outwardly from the casing body in the direction opposite to the operating lever 5, and by the operation of which the hazard warning actuating member is movable in axial direction between a disabled position and an actuated position. A holder 9 carrying movable contacts 15 and 16 is mounted within the hazard warning actuating member 11 so as to be movable transverse to the axis of said member and its knob 12. A projection 10 integral with the holder 9 and projecting upwardly therefrom engages in the groove 6 of the actuating member 3, passing through an elongated slot 11a which extends in the direction transverse to the axis of the member 11 and its knob 12 and through an opening provided at the bottom of casing body 2 or upper wall of recess 7.

The actuating member 11 is disposed within the recess 7 so that it is movable within said recess, as described below, a distance L at a time, which distance corresponds to one axial pitch provided on the plate 8 carrying stationary contacts.

On the plate 8, as best shown in FIG. 3, there are provided a first to fourth row I, II, III and IV of stationary switch contacts which run substantially transverse to the longitudinal axis of the operating lever 5 and of the hazard warning actuating member 11 and which extends parallel with each other with equal distances L therebetween, and on which the movable contacts 15 and 16 of switch means travel. At certain junctions between said four rows I, II, III, IV and lines (a) to (e) which include the line (a) crossing said four rows at their centers and the other four lines (b), (c), (d), (e) extending on opposite sides of said line (a) with equal angular distances therebetween, there are provided the stationary contacts.

Figure 5:
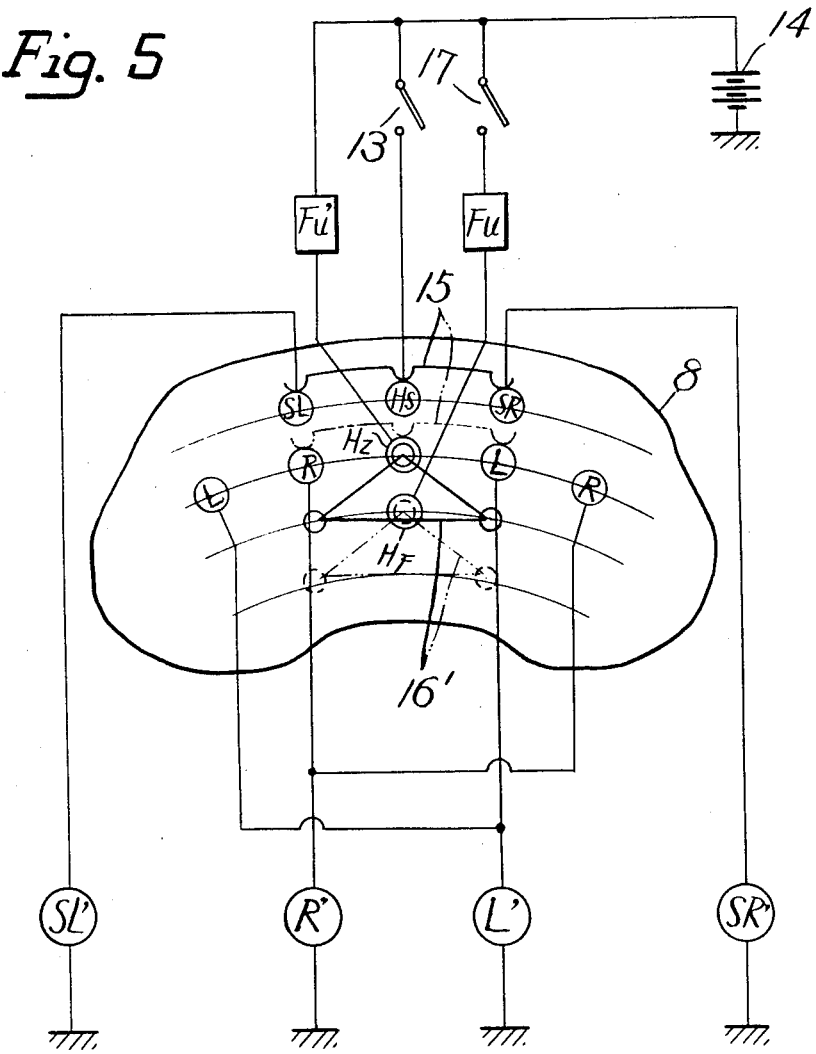
FIG. 5 is a wiring diagram of another embodiment of the stationary contacts.

The above-mentioned first row I is a row provided with stationary contacts for indicator or parking lamps, said stationary contacts including a contact Hs which is at the center of said row and is connected to an electric source 14, FIG. 4, through a lamp switch 13, and contacts SR and SL respectively connected to a right-hand indicator or parking lamp SR' and a left-hand indicator or parking lamp SL'. The second row II is a row with stationary contacts for hazard warning signaling, which comprises a contact Hz located at the center of this row and connected to the electric source 14 through a flasher unit Fu' for hazard warning signaling, and contacts R and L respectively located on the opposite sides of the contact Hz and connected to a right-hand turn signaling lamp R' and a left-hand signaling lamp L'. The third row III is a row with stationary contacts for the turn signaling lamps, which include a contact Hf located at the center of said row and connected through a flasher unit Fu to the electric source 14 and two other contacts R and L which are located on the opposite sides of the contact Hf, similarly to those on the second row II. On the fourth row IV, there is not provided any contact. The aforementioned movable contact 15 which is carried by the holder 9, bridges, when the actuating member 3 is at its neutral position, all of the stationary contacts on the first row I, viz., the contacts Hs, SR and SL; and the movable contact 16 bridges, when the actuating member 3 is at its neutral position, the stationary contact Hf on the third row III and positions on opposite sides thereof where no contact is provided. The neutral positions of contacts 15 and 16 are represented by solid lines in FIG. 4. Said movable contact 16 might be, as shown in FIG. 5, a three point triangular contact 16' which normally bridges the stationary contact Hz on the second row and two positions on opposite sides of contact Hf on the third row where no contact is provided. In this instance, the contacts R and L on the third row become useless. Numeral 17 indicates an ignition switch.

The present apparatus functions as follows:

When the actuating member 3 is at its neutral position, the movable contact 15 bridges the contact Hs and contacts SR and SL on the first row, whereby the left and right-hand indicator or parking lamps SR' and SL' are turned on upon the closing of the switches 13 and 17, as shown by solid lines in FIGS. 4 and 5. When the actuating member 3 is moved to the left, for instance, by the manipulation of the operating lever 5 to effect the sliding movement of holder 9 on the contact plate 8 to the left from the position shown in FIG. 2, the movable contact 15 connects the contacts Hs and SL on the first row, being released from its contact with the contact SR on the same row, and the other movable contact 16 bridges the contacts Hf and R on the third row, whereby the left-hand parking lamp SL' remains energized, and the right-hand parking lamp SR' is turned off and the right-hand turn signaling lamp R' flashes. Conversely, when switches 13 and 17 are closed and lever 5 is operated to shift holder 9 to the right from the position illustrated in FIG. 2, contact 15 becomes disengaged from contact SL to deenergize left-hand parking lamp SL' while maintaining right-hand parking lamp SR' energized through contact Hs and switch 13, and contact 16 connects stationary contact L in the third row through stationary contact Hf, the flasher unit F u and switch 17 with the power supply to energize left-hand turn signaling lamp L'.

When the hazard warning actuating member 11 is shifted from its disabled position to its actuated position, having been pushed by the knob 12 towards the row IV or in the direction towards the operating lever 5, regardless whether the holder 9 is at its neutral position or at either one of opposite sides of neutral position, the movable contact 15 shifts onto the second row and the other movable contact 16 comes onto the fourth row, as indicated by broken lines in FIG. 4, whereby both the left and right-hand parking lamps are turned off and both the left and right-hand turn signaling lamps flare so as to indicate a hazard warning. Moreover, as will be apparent from examination of FIGS. 4 and 5, as long as the member 11 remains in its actuated or hazard signaling position, whether holder 9 is swung to right or left of its neutral position to indicate a right or left hand turn, movable contact 15 will continue to maintain both the left and right-hand turning lamp L' and R' energized through one of the two pairs of stationary contacts L and R which are disposed in the second row (Row II) at opposite sides of the stationary contact Hz.

The embodiment illustrated in FIG. 5 operates in similar manner to that shown in FIG. 4. The only difference is that here contact 16', which is used instead of the contact 16 of FIG. 4, is triangular in shape.

What is claimed is:

1. A combined direction, parking and hazard warning signaling apparatus for automotive vehicles: which comprises a base member, a direction signal actuating member mounted on said base member for sliding and pivotal movement thereon, an operating lever connected to said actuating member to pivot said actuating member from a neutral position to operating positions at opposite sides thereof;

a hazard warning actuating member mounted on said base member and movable from a disabled position to an actuated position in a direction substantially transverse to the direction of movement of the direction signal actuating member;

movable contact means operatively connected both to the direction signal actuating member and to the hazard warning actuating member and movable selectively upon actuation of the direction signal actuating member or the hazard warning actuating member; stationary contact means positioned to be selectively connectable with the movable contact means and including at least three rows of stationary contacts, each row extending in a direction substantially parallel to the direction of movement of the direction signal actuating member, said rows being equally-spaced from one another in the direction of movement of the hazard warning actuating member, a first of said rows of stationary contacts including a first contact connected to an electric power source through first switch means and two further contacts spaced on opposite sides of said first contact and connected, respectively, to left and right-hand parking lamps, a second row of said stationary contacts including a first contact, and two pairs of spaced contacts spaced on opposite sides, respectively, of said first contact of said second row connected, connecte respectively, to left and right turn signaling lamps, and a third row of said stationary contacts including at least a central contact, a first flasher unit connecting said first contact of said second row to said electric power source; a second flasher unit and a second switch means connecting said central contact of said third row to said electric power source;

said movable contact means bridging, when the direction signal actuating member is at its neutral position and the hazard warning actuating member is at its disabled position, all three of said contacts in said first row upon closing said switch means to effect turning-on of the parking lamps, and completing, when the direction signal actuating member is pivoted to one of its operating positions, an electric circuit for energizing the turn signaling lamp corresponding to the desired turning direction of the vehicle by means of the central contact in the third row, and simultaneously disconnecting the first contact in said first row from the further contact on the first row which is connected to a parking lamp on the side corresponding to the energized turning signaling lamp, and bridging, when the hazard warning actuating member is at its actuated position, the first contact in said second row and the two adjacent contacts in the second row to flash both the left and right-hand turn signal lamps, while disconnecting the contacts in the first row which connect with the parking lamps.

2. A combined direction, parking and hazard warning signaling apparatus as claimed in claim 1, in which
said third row has at least a pair of second contacts on opposite sides of the central contact, and
said movable contact means bridges, when the direction signal actuating member is turned to one of the operating positions, the central contact and one of said pair of contacts in the third row.

3. A combined direction, parking and hazard warning signaling apparatus as claimed in claim 2, in which
said movable contact means includes a first contact element and a second contact element, and
said first contact element normally bridging all the contacts in said first row and said second contact element normally contacting only the central contact in the third row, when said hazard warning actuating member is in its disabled position.

4. A combined direction, parking and hazard warning signaling apparatus as claimed in claim 1, in which said movable contact means bridges, when the direction signal actuating member is pivoted to one of its operating positions, the central contact on the third row and one of the contacts of one of said pairs thereof in the second row.

5. A combined direction, parking and hazard warning signaling apparatus as claimed in claim 4, in which
said movable contact means includes a first contact element and a second contact element, and
said first contact element bridging all the contacts in said first row when said movable contact means is in neutral position, and said second contact element has three contact points, a selected one of which contacts the central contact in said third row, and another of which is engageable selectively with one contact of each of the two pairs thereof in said second row, when said hazard warning actuating member is in its disabled position.

* * * * *